United States Patent Office 3,436,395
Patented Apr. 1, 1969

3,436,395
PREPARATION OF ALKLATED 1,10-
PHENANTHROLINES
Brian Colwell Ennis, Ripponlea, Victoria, and Henry Peter Crocker, North Balwyn, Victoria, Australia, assignors to Monsanto Chemicals (Australia) Limited, West Footscray, Victoria, Australia, a company of Victoria, Australia
No Drawing. Filed Sept. 8, 1964, Ser. No. 395,065
Claims priority, application Australia, Sept. 12, 1963, 35,321/63
Int. Cl. C07d 39/14, 33/54
U.S. Cl. 260—288    3 Claims This invention relates to the preparation of alkyl substituted 1,10-phenanthrolines. In particular, it is concerned with tetramethyl-1,10-phenanthrolines and, more especially, the 3,4,7,8-tetramethyl-1,10-phenanthroline.

In copending application Ser. No. 390,171, filed Aug. 17, 1964, there is described the preparation of phenanthrolines from 8-aminoquinolines and β-vinyl ketones in a reaction medium consisting essentially of arsenic acid. Such a process gives much better results than the usual Skraup reaction when the same essential components are reacted in the presence of sulfuric or phosphoric acid. When the process of the said copending application is applied to the preparation of tetramethyl-1,10-phenanthrolines, more specifically, 3,4,7,8-tetramethyl-1,10-phenanthroline, it has been found that the maximum yield obtained is not higher than about 65%. Investigations which have been conducted in the matter reveal that the main reason for the indicated comparatively low yield of tetramethyl phenanthroline arises from the incidental formation of the corresponding 1,2,3,4 - tetrahydro - tetramethyl - 1,10 - phenanthroline, more specifically, the 1,2,3,4-tetrahydro-3,4,7,8-tetramethyl-1,10-phenanthroline.

It has now been found that alkyl substituted 1,10-phenanthrolines represented by the structural formula,

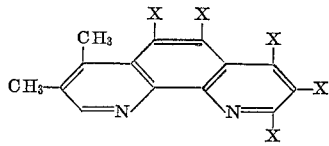

wherein X is selected from hydrogen, methyl and ethyl, can be obtained in high yield by the process which comprises forming a reaction product consisting of a mixture of such an alkyl substituted 1,10-phenanthroline and the correspondingly substituted 1,2,3,4-tetrahydro-1,10-phenanthroline represented by the structural formula,

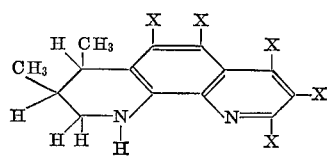

wherein X is selected from hydrogen, methyl and ethyl, in a cyclization stage. Said stage comprises heating, at a temperature up to 100° C., in the presence of an acidic catalyst, a quinoline selected from 8-aminoquinolines and salts of 8-aminoquinolines in which said 8-aminoquinolines are represented by the structural formula,

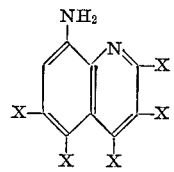

wherein X is selected from hydrogen, methyl and ethyl, with a carbonyl component selected from methyl isopropenyl ketone and precursors which generate such ketone under aqueous acidic conditions. The 1,2,3,4-tetrahydro-1,10-phenanthroline component of said reaction product is converted to said alkyl substituted 1,10-phenanthroline, in an oxidation stage, by heating said 1,2,3,4-tetrahydro-1,10-phenanthroline component at a temperature within the range of 110–130° C. in the presence of arsenic acid in association with a hydrohalic acid selected from hydrochloric acid and hydrobromic acid, and recovering the desired alkyl substituted 1,10-phenanthroline from the reaction mixture.

The process of the invention is particularly concerned with the preparation of 3,4,7,8-tetramethyl-1,10-phenanthroline, according to which methyl isopropenyl ketone or a precursor of methyl isopropenyl ketone is first reacted with 3,4-dimethyl-8-aminoquinoline in the presence of an acid catalyst to give a mixture of 3,4,7,8-tetramethyl-1,10-phenanthroline and 1,2,3,4-tetrahydro-3,4,7,8-tetramethyl-1,10-phenanthroline. Said tetrahydro component is then oxidized to the 3,4,7,8-tetramethyl-1,10-phenanthroline by heating with a mixture of arsenic acid and hydrochloric or hydrobromic acid as indicated, and the desired 1,10-phenanthroline is recovered from the reaction mass.

In carrying out the first or cyclization stage of the process of the invention, the 3,4-dimethyl-8-aminoquinoline or other selected 8-aminoquinoline is reacted with methyl isopropenyl ketone or a precursor of methyl isopropenyl ketone in the presence of the acid catalyst, preferably by using a slight molar excess of the ketone component and gradually adding it or its precursor to a mixture of the 8-aminoquinoline and the acid catalyst, since methyl isopropenyl ketone polymerizes readily. A reaction temperature of 30–100° C. is suitable; however, 60–70° C. is preferred. At temperatures below 30° C., the reaction is very slow, while at temperatures much above 90° C., some degradation of the aminoquinoline is likely to occur. The reaction time in this stage of the process depends upon the reaction temperature. For example, with temperatures in the order of 60–70° C., a period of two hours is sufficient for the reaction to proceed to completion.

When the first or cyclization of the process is completed, the mixture of 1,10-phenanthroline and tetrahydro-1,10-phenanthroline so produced may be recovered from the reaction mass for oxidation to the desired 1,10-phenanthroline by basifying the acid catalyst and then separating said tetrahydro compound from said initially formed 1,10-phenanthroline, for example, by extraction of the basified mixture with a hydrocarbon solvent. We prefer, however, to proceed with the second or oxidation stage of the process, in which said tetrahydro compound is oxidized to the desired 1,10-phenanthroline, without isolation or separation of said tetrahydro compound.

The second or oxidation stage of the process takes place much more slowly than the first or cyclization step; hence, the higher reaction temperature specified is required. Using a hydrochloric acid/arsenic mixture as the oxidation stage reagent, a reaction time of 6–8 hours is required at the reflux temperature of the mixture for complete conversion of said tetrahydro compound. A shorter reaction period in the oxidation stage, in general, is possible by operating at superatmospheric pressures.

An inert solvent may be used in carrying out the process of the invention; however, this is not usually required. At the end of the oxidation reaction, the phenanthroline may be recovered from the reaction mass by any suitable means. Thus, the reaction mass, in the form of a solution, may be basified and the desired 1,10-phenanthroline separated by filtration and purified by crystallization or sublimation, or by any of the other known purification methods.

Examples of 8-aminoquinolines, other than 3,4-dimethyl-8-aminoquinoline, which may be used in the process of the invention include 8-aminoquinoline; 3-methyl-8-aminoquinoline; 2,4-dimethyl-8-aminoquinoline; 3,5,6-trimethyl-8-aminoquinoline; 3,4-dimethyl-5,6-diethyl-8-aminoquinoline; 3,4,5,6-tetramethyl-8-aminoquinoline; and 4-methyl-8-aminoquinoline. Acid addition salts of the 8-aminoquinolines which can be used in process of the invention include the salts of the mineral acids, e.g., the hydrochloride or sulfate salts. In some cases, an acid addition such as the hydrochloride may be preferred in providing acidic conditions for use in conjunction with precursors for generating the methyl isopropenyl ketone component.

As employed herein, the phrase "precursors of methyl isopropenyl ketone" connotes those materials which are readily converted to said ketone upon treatment with mineral acid and water. The nature of such precursors, and their use in Skraup-type reactions, is known to the art.

Methyl isopropenyl ketone and other such β-vinyl ketones are often prepared by condensing an aldehyde with a methylene group which is alpha to the carbonyl group of the ketone, followed by dehydration of the resultant β-hydroxy ketone to the required β-vinyl ketone. Thus, methyl isopropenyl ketone is commonly prepared by condensing formaldehyde with methyl ethyl ketone, which gives 1-hydroxy-2-methylbutan-3-one as intermediate, and this intermediate may be dehydrated by heating in the presence of a mineral acid catalyst to give methyl isopropenyl ketone. Accordingly, it is sometimes more convenient to use such a precursor of methyl isopropenyl ketone as a reactant in the synthesis of the tetrahydro-1,10-phenanthrolines of this invention, the desired ketone being generated in situ (i.e., by the use of 1-hydroxy-2-methylbutan-3-one as the carbonyl component). Precursors of methyl isopropenyl ketone useful for carrying out the process of the invention can be represented by the structural formulae,

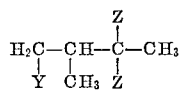

and

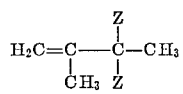

and

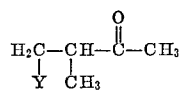

wherein Y is selected from hydroxy, alkoxy, acetoxy and halogen; and wherein Z is selected from alkoxy, acetoxy and halogen. In these cases, the alkyl and alkoxy groups preferably contain from 1 to 4 carbon atoms, and the halogen is preferably chlorine. Examples of such precursors, other than 1-hydroxy-2-methylbutan-3-one, include 1-chloro-2-methylbutan-3-one; 1 - alkoxy-2-methylbutan-3-ones; methyl isopropenyl ketone diacetate; 1,3,3-trialkoxy-2-methylbutanes; and 1,3,3-trichloro-2-methylbutane.

The acid catalyst used in the first or cyclization stage of the process may be an organic acid selected from formic, acetic, propionic and butyric acids, or an inorganic acid selected from phosphoric, sulfuric, hydrochloric and hydrobromic acids. The acid may be anhydrous, or it may be diluted with water; dilution with water is advantageous in the case of sulfuric acid, as decomposition of the methyl isopropenyl ketone is thereby reduced. When an organic acid is used as acid catalyst for the first or cyclization stage of the process, it may be advantageous to recover the bulk of the acid before proceeding with the second or oxidation stage. Thus, when acetic acid is used, the bulk of the acid may be recovered by distillation before treating the reaction mixture with the arsenic acid and hydrochloric or hydrobromic acid mixture. On the other hand, when hydrochloric acid or hydrobromic acid is used as acid catalyst in the first or cyclization stage, it is necessary merely to add the arsenic acid component of the oxidizing mixture of acid to the reaction mass and then raise the temperature to 110–130° C. in order to complete the second or oxidation stage of the process. A minimum of one mol of the cyclization stage acid catalyst, based on the aminoquinoline component, should be employed, preferably in excess of one mol of acid being used.

Hydrochloric acid is preferred to hydrobromic acid for the oxidation stage since it is cheaper and freely available, and it gives a satisfactorily fast reaction rate and high yield of the desired product. A minimum of 3 mols of such acid, based on the aminoquinoline, should be used, the maximum amount not being particularly critical. As much as 20 mols is usable, and about 10 to 15 mols is usually required in order to maintain a suitably fluid reaction mixture for ease of working. The concentration of such acid is not critical, but is preferably adjusted so that the final mixture approximates the constant boiling mixture at atmospheric pressure. The arsenic acid is used in the form of arsenic pentoxide or as the 80% arsenic acid of commerce. The minimum amount of arsenic acid used in the process should be one mol based on the aminoquinoline, preferably not more than 1.5 mols being used due to the cost of arsenic acid.

The process of the invention is illustrated by the following non-limitative practical examples:

EXAMPLE 1

1-hydroxy-2-methylbutan-3-one (15.3 g., 0.15 M) was added over one hour to 3,4-dimethyl-8-aminoquinoline (17.2 g., 0.1 M) in hydrochloric acid (150 ml.) at 65–70° C. After completion of the addition, the reaction mixture was maintained at this temperature for one hour and then raised to the boiling point. Unreacted hydroxymethyl butanone decomposed to methyl isopropenyl ketone, which was steam distilled from the reaction mixture, and then arsenic acid (65% $As_2O_5$, 16 ml.) was added to the reaction mixture heated under reflux for 7½ hours. The reaction mixture was poured into water (500 ml.) and, when cool, it was filtered and treated with decolorizing carbon (1 g.). The solution was neutralized with sodium hydroxide, and the precipitated product was washed well with water, dried and washed with benzene (2.0 ml.) to give 3,4,7,8-tetramethyl - 1,10 - phenanthroline (83%), M.P. 278–280° C.

EXAMPLE 2

Methyl isopropenyl ketone (10.1 g., 1.2 M), 3,4-dimethyl-8-aminoquinoline (17.2 g.) and acetic acid (50 ml.) were heated at 95–100° C. for 3 hours. The solution was then distilled until 40 ml. had been collected. Then hydrochloric acid (150 ml.) and arsenic acid (80%, 10 ml.) were added to the reaction mixture, which was then heated under reflux for 8 hours. The product was isolated as in the above example to give 3,4,7,8-tetramethyl-1,10-phenanthroline (16.5 g. 70%), M.P. 276–279° C.

While the invention has been described herein with regard to certain specific embodiments, it is not so limited. It is to be understood that variations and modifications thereof may be made by those skilled in the art without departing from the spirit or scope of the invention.

What is claimed is:

1. A process comprising heating a phenanthroline of the formula,

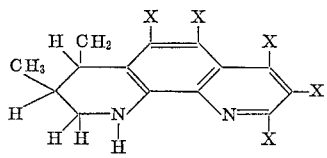

wherein each X is selected from the group consisting of hydrogen, methyl and ethyl, in the presence of a mixture of arsenic acid and a hydrohalic acid selected from the group consisting of hydrobromic and hydrochloric acids, said heating being at a temperature within the range of 110° C. to 130° C.

2. A process as defined in claim 1 wherein the phenanthroline is 1,2,3,4-tetrahydro-tetramethyl-1,10-phenanthroline, and the hydrohalic acid is hydrochloric acid.

3. A process as defined in claim 1 wherein the phenanthroline is 1,2,3,4-tetrahydro-3,4,7,8-tetramethyl-1,10-phenanthroline, and the hydrohalic acid is hydrochloric acid.

References Cited

Elderfield: Heterocyclic Chemistry, vol. 4, Wiley 1952, pp. 21-24 relied on. QD 400 E4.
Case: J. Am. Chem. Soc., vol. 70, pp. 3994-6 (1948).
Willink: Rec. Trav. Chim., vol. 54, p. 282 (1935).
Badger et al.: Aust. J. Chem., vol. 16, pp. 814, 840-44 (1963).

ALEX MAZEL, *Primary Examiner.*

D. G. DAUS, *Assistant Examiner.*

U.S. Cl. X.R.

260—593, 594, 601, 615, 687